United States Patent
Chaplin et al.

(10) Patent No.: US 11,853,731 B2
(45) Date of Patent: Dec. 26, 2023

(54) PULSE GENERATION

(71) Applicant: IonQ, Inc., College Park, MD (US)

(72) Inventors: Vandiver Chaplin, Washington, DC (US); Jason Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 184 days.

(21) Appl. No.: 16/828,233

(22) Filed: Mar. 24, 2020

(65) Prior Publication Data

US 2021/0303282 A1 Sep. 30, 2021

(51) Int. Cl.
*G06F 8/41* (2018.01)
*G06N 10/00* (2022.01)

(52) U.S. Cl.
CPC ............... *G06F 8/41* (2013.01); *G06N 10/00* (2019.01)

(58) Field of Classification Search
CPC .......... G06F 8/41; G06F 8/447; G06N 10/00; G06N 10/20; G06N 10/80
See application file for complete search history.

(56) References Cited

U.S. PATENT DOCUMENTS

| | | | |
|---|---|---|---|
| 7,899,092 B2 | 3/2011 | Malinovsky | |
| 10,333,503 B1 * | 6/2019 | Cohen | G06F 15/80 |
| 10,423,887 B2 * | 9/2019 | Roetteler | B82Y 10/00 |
| 10,447,278 B1 * | 10/2019 | Reohr | H03K 19/1952 |
| 10,536,224 B1 * | 1/2020 | Nation | G06N 10/00 |
| 10,664,249 B2 * | 5/2020 | Amy | G06N 10/00 |
| 10,756,738 B2 * | 8/2020 | Reohr | H03K 19/1952 |
| 10,790,912 B2 * | 9/2020 | Nation | H04B 10/70 |
| 10,826,845 B2 * | 11/2020 | Dadashikelayeh | G06F 9/5083 |
| 10,860,759 B2 * | 12/2020 | Roetteler | G06F 30/327 |
| 10,862,465 B1 * | 12/2020 | Cohen | H03K 3/38 |
| 10,908,885 B2 * | 2/2021 | Ducore | G06F 8/427 |
| 11,010,145 B1 * | 5/2021 | Smith | G06N 10/00 |
| 11,062,079 B2 * | 7/2021 | Martiel | G06F 30/398 |
| 11,115,012 B2 * | 9/2021 | Cohen | G06N 3/04 |
| 11,194,573 B1 * | 12/2021 | Smith | G06N 10/40 |
| 11,416,228 B2 * | 8/2022 | Chong | G06N 10/80 |
| 11,494,681 B1 * | 11/2022 | Peterson | G06N 10/00 |

(Continued)

OTHER PUBLICATIONS

Pilch, Jakub, and Jacek Długopolski. "An FPGA-based real quantum computer emulator." Journal of Computational Electronics 18.1 (2019): 329-342. (Year: 2019).*

(Continued)

*Primary Examiner* — Matthew J Brophy
(74) *Attorney, Agent, or Firm* — Butzel Long

(57) ABSTRACT

Systems and techniques are provided for pulse generation. A classical computing device may receive a program source code including quantum operations. The program source code may be compiled into a compiled program including the one or more quantum operations. Pulse shapes that a pulse shape library indicates corresponds to each of the quantum operations may be determined. Pulse instructions based on the one or more pulse shapes that the pulse shape library indicates corresponds to each of the quantum operations may be generated. Binary format instructions may be generated based on the pulse instructions. The binary format instruction may encode the pulse instructions in binary packets using a binary code of a field programmable gate array (FPGA) of a quantum computing device.

18 Claims, 8 Drawing Sheets

(56) References Cited

U.S. PATENT DOCUMENTS

| | | | |
|---|---|---|---|
| 2017/0147303 A1* | 5/2017 | Amy | G06N 10/00 |
| 2017/0255872 A1* | 9/2017 | Hamze | G06F 17/10 |
| 2018/0144262 A1* | 5/2018 | Roetteler | B82Y 10/00 |
| 2018/0181685 A1* | 6/2018 | Roetteler | G09C 1/00 |
| 2019/0042973 A1 | 2/2019 | Zou | |
| 2019/0205783 A1* | 7/2019 | Nam | G06N 10/00 |
| 2019/0378033 A1* | 12/2019 | Figgatt | G06N 10/20 |
| 2020/0028512 A1* | 1/2020 | Reohr | H03K 19/1952 |
| 2020/0274622 A1* | 8/2020 | Nation | H04B 10/70 |
| 2020/0285985 A1* | 9/2020 | Javadiabhari | G06N 10/00 |
| 2020/0285986 A1* | 9/2020 | Javadiabhari | G06N 10/70 |
| 2020/0364602 A1* | 11/2020 | Niu | G06N 10/00 |
| 2020/0394027 A1* | 12/2020 | Ducore | G06F 8/437 |
| 2021/0012233 A1* | 1/2021 | Gambetta | G06F 8/44 |
| 2021/0019269 A1* | 1/2021 | Nation | G06F 17/13 |
| 2021/0036692 A1* | 2/2021 | Cohen | G06N 10/00 |
| 2021/0081779 A1* | 3/2021 | Kanazawa | G06N 3/044 |
| 2021/0109871 A1* | 4/2021 | Nation | G06F 17/11 |
| 2021/0132969 A1* | 5/2021 | Smith | G06F 9/45504 |
| 2021/0232960 A1* | 7/2021 | Genin | H03K 19/195 |
| 2021/0334081 A1* | 10/2021 | Chong | G06F 9/4881 |

OTHER PUBLICATIONS

Alexander, Thomas, et al. "Qiskit pulse: programming quantum computers through the cloud with pulses." Quantum Science and Technology 5.4 (2020): 044006. (Year: 2020).*

Karalekas, Peter J., et al. "A quantum-classical cloud platform optimized for variational hybrid algorithms." Quantum Science and Technology 5.2 (2020): 024003. (Year: 2020).*

Gokhale, Pranav, et al. "Partial compilation of variational algorithms for noisy intermediate-scale quantum machines." Proceedings of the 52nd Annual IEEE/ACM International Symposium on Microarchitecture. 2019. (Year: 2019).*

International Search Report and Written Opinion issued in PCT/US2021/023861 dated Jun. 4, 2021, 10 pages.

\* cited by examiner

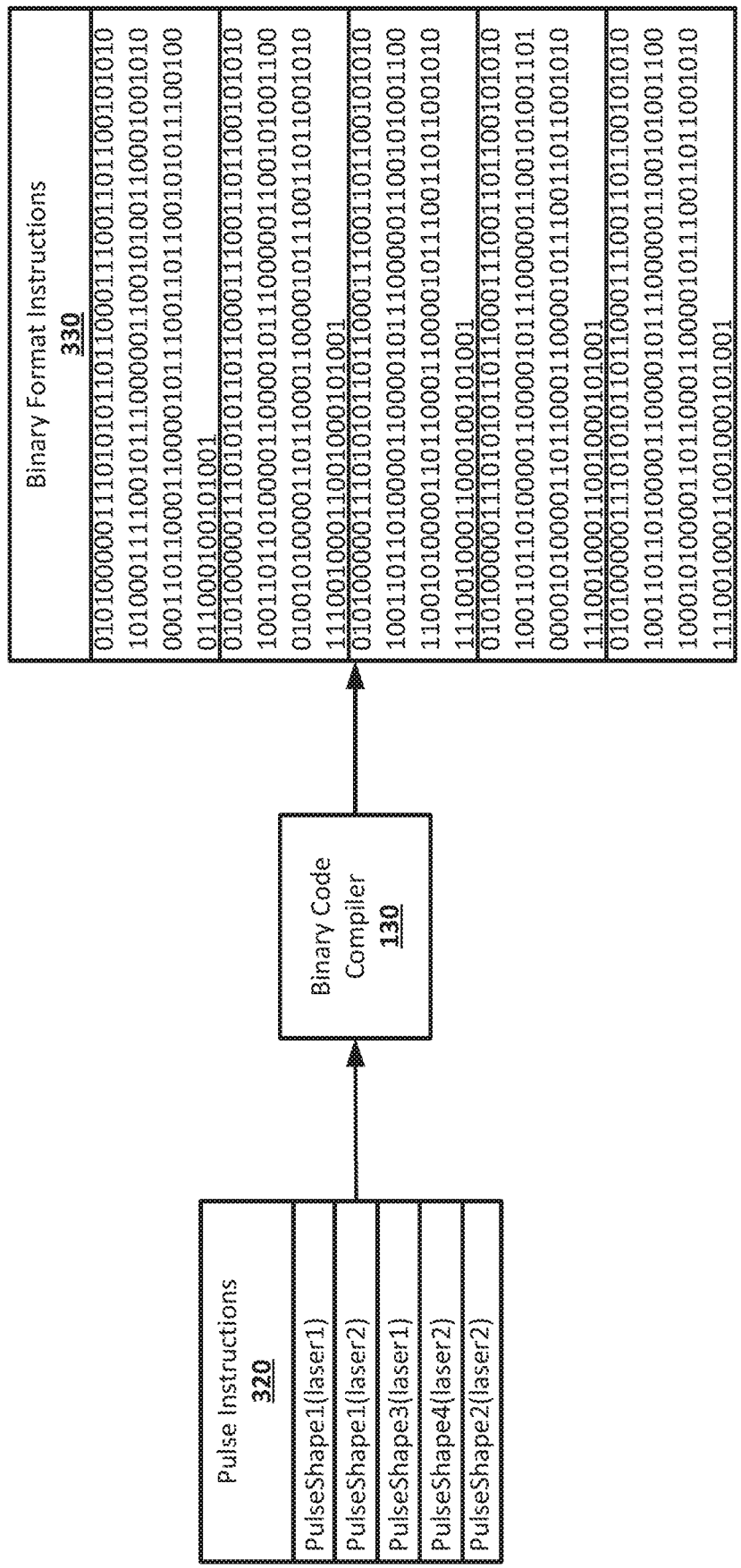

PULSE GENERATION

BACKGROUND

Trapped ion quantum computers may operate using lasers and/or microwaves. The lasers and/or microwaves may be used to control and measure the states of trapped ions and to perform quantum computing operations. Laser light directed at the trapped ions may need to be pulsed or modulated in specific patterns to perform different quantum computing operations. Programs written to run on a trapped ion quantum computer may need to include instructions for the operation of the laser modulation system so that the proper pulses are generated to implement the quantum computing operations in the program.

BRIEF SUMMARY

According to implementations of the disclosed subject matter, a classical computing device may receive a program source code including quantum operations. The program source code may be compiled into a compiled program including the one or more quantum operations. Pulse shapes that a pulse shape library indicates corresponds to each of the quantum operations may be determined. Pulse instructions based on the one or more pulse shapes that the pulse shape library indicates corresponds to each of the quantum operations may be generated. Binary format instructions may be generated based on the pulse instructions. The binary format instruction may encode the pulse instructions in binary packets using a binary code of a field programmable gate array (FPGA) of a quantum computing device.

Systems and techniques disclosed herein may allow for pulse generation. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 3B shows an example arrangement suitable for pulse generation according to an implementation of the disclosed subject matter.

DETAILED DESCRIPTION

Figure 1:
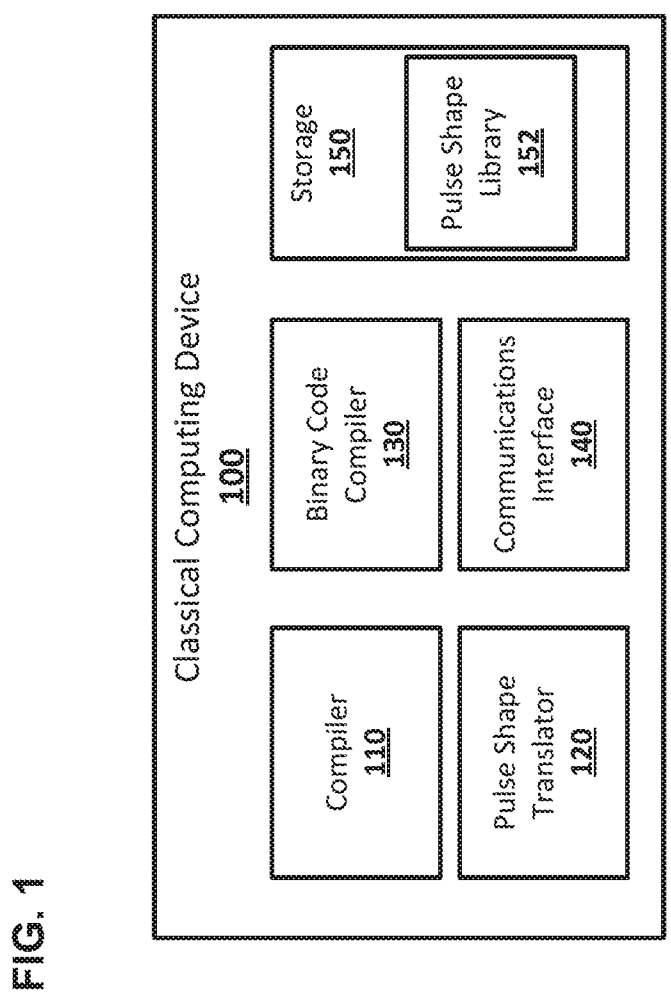
FIG. 1 shows an example system suitable for pulse generation according to an implementation of the disclosed subject matter.

According to embodiments disclosed herein, pulse generation may be used to generate instructions to control lasers and laser modulation systems to perform quantum operations. The lasers and laser modulation systems may be, for example, components of a trapped ion quantum computing device. A program may include quantum operations used in quantum computing. The program may be a hybrid program that includes both classical and quantum operations, or may only include quantum operations. The quantum operations in a program may be looked up in a library of pulse shapes. The appropriate pulse shapes to cause the lasers and laser modulation system of the quantum computing device to perform the quantum operations may be selected from the library. The pulse shapes selected from the library of pulse shapes may have parameters that may be set based on calibration and environmental parameters of the quantum computing device and its components. The selected pulse shapes, with their parameters, may be used to generate instructions that may be used to control the laser modulation system of the quantum computing device to perform quantum operations from the program by directing laser pulses at trapped ions using laser light generated by the lasers of the quantum computing device. In some implementations, a collection of pulse primitives may be used to generate the instructions used to control the lasers of the quantum computing device.

A program intended to run a quantum computing device, such as a trapped ion quantum computing device, may include quantum operations. The program may be a quantum program that uses only quantum operations, or may be a hybrid program that uses both classical and quantum operations. For example, the program may be hybrid program that may be executed on a classical computing device that may be communication with a quantum computing device through any suitable communications interface. When a hybrid program is executed, the classical operations may be executed on the classical computing device, and the quantum operations may be sent to the quantum computing device, which may return results of the quantum operations to the classical program through the communications interface. A quantum program may be sent to be executed on a quantum computing device directly through a communications interface with a classical computing device, and the results of the quantum operations may be returned to the part of the communications interface running on the classical computing device. The program may be written in any suitable language.

The quantum operations of the program may be specified in any suitable manner, including, for example, using a quantum computing language or quantum computing syntax or extension of a classical programming language. The quantum operations of the program may include initialization and measurement operations and operations specified using quantum gates, which may also be used to form quantum circuits. A quantum gate may specify the qubits of the quantum computing device that the quantum gates is to be applied to. In a trapped ion quantum computing device, each trapped ion may store the state of a single qubit, and quantum gates may be applied to the qubits through the lasers of the quantum computing device applying pulses of laser light to the trapped ions, for example, entangling the ions to implements quantum gates that operate on more than on qubit. The laser light may be directed to components of a laser modulation system. The laser light may be pulsed using the laser modulation system, generating laser pulses. The laser pulses may result from the pulsing, shaping, and modulation by a laser modulation system of laser light generated by the lasers, and may be used in both classical and quantum operations that affect trapped ions. The laser modulation system may include any suitable hardware devices and components, including, for example, acousto-optic modulators, electro-optic modulators, physical optics components, electronic gating and all associated mechanically or electronically driven subcomponents. The laser modulation system may also use microwaves, generated by any suitable microwave generating hardware, in place of or in conjunction with the lasers. The lasers of the trapped ion quantum computing device may also be used to initialize state of the qubits of the trapped ions before the application of quantum gates to the qubits and to measure state of the qubits of the trapped ions after the application quantum gates to the qubits.

The program, including the quantum operations, may be compiled before being executed. For example, the program's source code may be compiled on a classical computing device running a compiler for hybrid or quantum programs. The quantum operations in the program may be compiled into a format that may allow the compiled program to be used with any type of quantum computing device. The quantum operations in the compiled program may not be compiled specifically to be run on a trapped ion quantum computing device.

The quantum operations from the compiled program may be used to generate instructions to control the lasers and the laser modulation system of the quantum computing device by looking up the quantum operations in a pulse shape library. This may allow for execution of the quantum operations of the compiled program on a trapped ion quantum computing device. The pulse shape library may be a database that may include complete pulse shapes. A complete pulse shape in the pulse shape library may correspond to a quantum operation, including initialization and measurement operations and operations that apply quantum gates to qubits. A complete pulse shape may specify the laser pulse directed at a trapped ion that implements the operation. The quantum operations from the compiled program may be looked up in the pulse shape library to determine the pulse shapes that correspond to each quantum operation. The pulse shapes that correspond to the quantum operation may be used to generate pulse instructions that may be able to cause the laser modulation system of a trapped ion quantum computing device to generate pulses with those pulse shapes by modulating laser light from lasers of the trapped ion quantum computing device. The pulse shapes from the pulse shape library may be adjusted based on parameters of the quantum computing device to generate the final pulse shapes that will be generated by the lasers. The parameters may include, for example, calibration parameters of various components of the quantum computing device, including lasers, the laser modulation system, and mirrors, and the environmental parameters of the quantum computing device. The parameters may be determined through theoretical derivation or empirical measurement, for example, by measurement devices of the quantum computing device, and some parameters may be constant while other parameters may be updated frequently. The pulse instructions may be generated in any suitable form. For example, the pulse instructions may be generated in human-readable format. Human-readable pulse instructions may include text describing the pulse shapes to be generated, including the parameters of the pulse shapes and the desired timing of the generation of the pulse shapes, such that a person may be able to recreate pulse shapes from human-readable pulse instructions. The pulse shapes may be stored in the pulse shape library in the form of these human-readable pulse instructions.

Instructions in a binary format may be generated from the pulse instructions. The binary format instructions may be a set of binary packets that may be used to control a Field Programmable Gate Array (FPGA) which may in turn control the lasers and laser modulation system of the quantum computing device. The binary packets may be generated using a binary code that may be specific to the FPGA of the quantum computing device. For example, a compiler or translator used to generate the binary format instructions may include binary codes that correspond to each of the pulse shapes in the library of pulse shapes and binary encodings for the parameters and timings for the pulse shapes. Each binary packet generated from the pulse instructions may specify a pulse shape, including the parameters and timing for the pulse shape, for one of the pulse shapes specified in the pulse instructions. The binary packets may all be of the same length, including the same number of bits.

In some implementations, pulse shapes may be generated using pulse primitives. An interface running on a classical computing device may allow for the specification of pulse shapes based on pulse primitives. The pulse primitives may include various aspects of a pulse shape, including, for example, amplitude, width, delay on each side of a pulse, timing, the pulse type, for example, box pulse type or curve pulse type, and other suitable parameters. A pulse grammar may be used to specify pulse shapes using the various pulse primitives and values assigned to the pulse primitives. This may allow for the direct specification of any pulse shape to implement any quantum operation. The pulse grammar may be used to directly write pulse instructions Instructions in a binary format may be generated from the pulse instructions generated using pulse primitives and the pulse grammar. For example, a compiler or translator used to generate the binary format instructions may include binary codes that correspond to each of the pulse primitives used in the pulse grammar and the values assigned to the pulse primitives. Each binary packet generated from the pulse instructions may specify a pulse shape, including the parameters and timing for the pulse shape for one of the pulse shapes specified using the pulse primitives and pulse grammar. The binary packets may all be of the same length, including the same number of bits.

The binary format instructions may be used to cause the lasers and laser modulation system of the quantum computing device to generate pulse shapes. For example, the binary format instructions may be sent through a communications interface from the classical computing device to the FPGA of the quantum computing device. The FPGA may be connected to the lasers and laser modulation system of the quantum computing device and may communicate with and control the operation of the lasers. The FPGA may translate the binary packets of the binary format instructions into instructions for the lasers and laser modulation system of the quantum computing device. The FPGA may control when the lasers turn on and off, and the power level of the lasers, and may control devices of the laser modulation system including, for example, acousto-optic modulators, electro-optic modulators, physical optics including lenses and mirrors, electronic gating, and any other suitable mechanical or electronic components and subcomponents, and may operate using microwaves to generate pulses with the pulse shapes specified in the binary packets of the binary format instructions. The pulse shapes may be signals resulting from static or time-dependent modulation of amplitude, phase, and/or frequency of laser light. This may result in the lasers and laser modulation system applying the quantum operations, such as initialization, measurement, and quantum gates, of the program to the trapped ions of the quantum computing device. Measurements of the trapped ions made by the lasers in accordance with the binary format instructions may be returned to the FPGA, allowing the results of the quantum operations to be returned from the FPGA to the communications interface on the classical computing device. The results of the quantum operation may be, for example, returned to a hybrid program that may still be executing on the classical computing device, which may perform classical operation on the results of the quantum operations. The results of the quantum operations may be the results of a quantum program, and may be, for example, stored, displayed, and/or used as data input to a classical computing program, on the classical computing device.

FIG. 1 shows an example system suitable for pulse generation according to an implementation of the disclosed subject matter. A classical computing device 100 may include a compiler 110, a pulse shape translator 120, a binary code compiler 130, a communications interface 140, and storage 150. The classical computing device 100 may be any suitable device, such as, for example, a computer 20 as described in FIG. 8, for performing classical computing and for implementing the compiler 110, the pulse shape translator 120, the binary code compiler 130, the communications interface 140, and the storage 150. The classical computing device 100 may be a single computing device, or may include multiple connected computing devices, and may be, for example, a laptop, a desktop, an individual server, a server farm, or a distributed server system, or may be a virtual computing device or system. The classical computing device 100 may be part of a computing system and network infrastructure, or may be otherwise connected to the computing system and network infrastructure. The compiler 110 may be any suitable combination of hardware and software for compiling program source code, including source code for hybrid programs and quantum programs. The pulse shape translator 120 may be any suitable combination of hardware and software for translating quantum operations included in a compiled program into pulse shapes using a pulse shape library 152 stored in the storage 150 to generate pulse instructions. The binary code compiler 130 may be any suitable combination of hardware and software for compiling pulse instructions into binary format instructions that include binary packets specifying pulse shapes. The communications interface 140 may be any suitable combination of hardware and software for allowing communication between the classical computing device 100 and a quantum computing device. The storage 150 may be any suitable combination of hardware and software for implementing any suitable combination of volatile and non-volatile storage, which may store, for example, the pulse shape library 152.

The compiler 110 may be any suitable combination of hardware and software for compiling program, including hybrid programs and quantum programs. The compiler 110 may be, for example, a compiler or interpreter that may operate on source code for a program written in any suitable programming language and that may include quantum operations. The program may be, for example, a hybrid program that may include both classical operations and quantum operations, or may be a quantum program, which may include only quantum operations. The compiler 110 may generate a compiled program from source code for a program input to the compiler 110.

The pulse shape translator 120 may be any suitable combination of hardware and software for translating quantum operations included in a compiled program into pulse shapes using the pulse shape library 152 to generate pulse instructions. The pulse shape translator 120 may, for example, look up quantum operations included in a compiled program in the pulse shape library 152 to determine the appropriate pulse shapes for implementing the quantum operations using the lasers of a trapped ion quantum computing device. The pulse shape translator 120 may generate pulse instructions that include these pulse shapes along with timings and other parameters set based on environmental parameters measured for the quantum computing device. The pulse instructions may be in a human-readable format. The pulse shape translator 120 may operate as middleware that may, for example, be utilized by the compiler 110, or may be called during execution of the compiled program on the classical computing device 100 when execution of the compiled program reaches quantum operations.

The binary code compiler 130 may be any suitable combination of hardware and software for compiling pulse instructions into binary format instructions that include binary packets specifying pulse shapes. The binary code compiler 130 may, for example, translate or compile pulse instructions generated by the pulse shape translator 120 into binary format instructions by generating binary packets for each pulse shape specified in the pulse instructions. The binary packets may be generated based on custom binary codes used by an FPGA that controls the lasers of a quantum computing device.

The communications interface 140 may be any suitable combination of hardware and software for allowing communication between the classical computing device 100 and a quantum computing device. The communications interface 140 may, for example, allow the classical computing device 100 to send data to and receive data from various components of a quantum computing device. Data sent to the quantum computing device may include, for example, instructions sent to hardware components of the quantum computing device to control the operation of the quantum computing device, include binary format instructions sent to an FPGA of the quantum computing device. Data received from the quantum computing device may include, for example, measurements of various calibration and environmental parameters of the quantum computing device taken by measurement devices, statuses for the hardware components of the quantum computing device, such as the current positions of motor-controlled mirrors, images from cameras of the quantum computing device, and the results of quantum operations performed by the quantum computing device, for example, as measured by lasers of the quantum computing device. The communications interface 140 may be used by hybrid programs, which may send binary format instructions to the quantum computing device to execute the quantum operations of the hybrid program and receive results back through the communications interface 140, and by quantum programs, which may be sent directly to the quantum computing device through the communications interface 140 and whose results may be received by the communications interface 140.

The storage 150 may be any suitable storage hardware connected to the classical computing device 100. For example, the storage 150 may be a component of the classical computing device, such as a flash memory module or solid state disk, or may be connected to the classical computing device 100 through any suitable wired or wireless connection. The storage 150 may be a local storage, i.e., within the environment within which the classical computing device 100 operates, or may be partially or entirely operated by a remote service. The storage 150 may store the pulse shape library 152. The pulse shape library 152 may include a database of pulse shapes that may be used to implement quantum operations using lasers of a trapped ion quantum computing device. The pulse shapes may be stored in the pulse shape library 152 in any suitable format, including, for example, human-readable text-based descriptions. The pulse shapes may be completed pulse shapes that may be usable without adjustment, but may be associated with parameters that may have their values adjusted to adjust the pulse shapes. The pulse shapes may be associated with the quantum operations that the pulse shapes implement, such as initialization and measurement operations and quantum gates, such that a quantum operation may be looked up in the pulse shape library 152 in order to retrieve the pulse shapes that implement that quantum operation.

Figure 2:
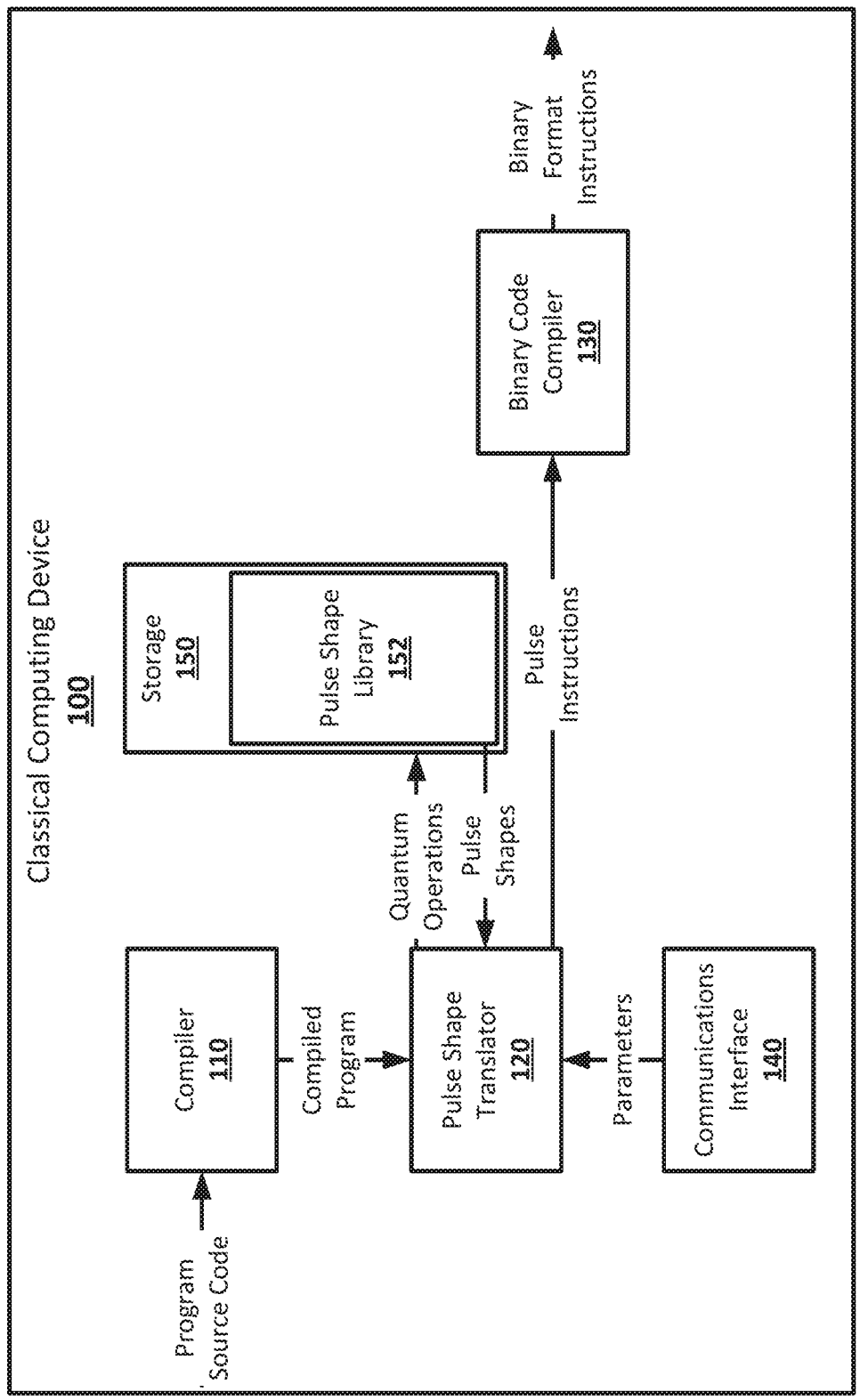
FIG. 2 shows an example arrangement suitable for pulse generation according to an implementation of the disclosed subject matter.

FIG. 2 shows an example arrangement suitable for pulse generation according to an implementation of the disclosed subject matter. Program source code may be input to the compiler 110. The program source code may be source code for a hybrid program, including both classical operations and quantum operations, or for a quantum program that only includes quantum operations. The program source code may be input into the compiler 110 in any suitable manner, including, for example, through an integrated development environment running on the classical computing device 100.

The compiler 110 may output a compiled program to the pulse shape translator 120. The compiler 110 may compile the program source code in any suitable manner. For example, a hybrid program may be written using a syntax for quantum operations that the compiler 110 may be able to compile along with the code for the classical operations into a single binary executable. The compiler 110 may also insert the quantum operations into the compiled program without changing them, for example, so that the quantum operations may appear, for example, as readable text when the compiled program is viewed through a hex viewer.

The pulse shape translator 120 may look up the quantum operations included in the compiled program in the pulse shape library 152. The pulse shape translator 120 may retrieve the appropriate pulse shapes for the quantum operations that are included in the compiled program. The pulse shape translator 120 may also receive parameters from the communications interface 140. The parameters may be, for example, environmental parameters and other parameters, such as calibration parameters, measured for the quantum computing device that will be used to execute the quantum operations specified in the program source code. The pulse shape translator 120 may combine the parameters with the pulse shapes from the pulse shape library 152 to generate pulse instructions. The pulse instructions may be in any suitable format, such as, for example, human readable format. The pulse instructions may include instructions that may specify each of the pulses that may be generated by the lasers of a quantum computing device to execute the quantum operations from the program source code. The pulse instructions may include timings for the pulses.

The pulse shape translator 120 may output the pulse instructions to the binary code compiler 130. The binary code compiler 130 may generate binary format instructions from the pulse instructions. The binary code compiler 130 may generate a binary packet for each of the instructions for pulse included in the pulse instructions. Each binary packet may be a binary code that may be used to cause an FPGA of the quantum computing device to control a laser of the quantum computing device to generate the pulse in the pulse shape from the pulse shape library 152, as modified by parameters input to the pulse shape translator 120, in order to carry out a quantum operation from the program source code. After being generated, the binary format instructions may be stored in the storage 150 where they may be used by, for example, the compiled program, or may be sent to the communications interface 140 to be sent to the quantum computing device for execution.

Figure 3A:
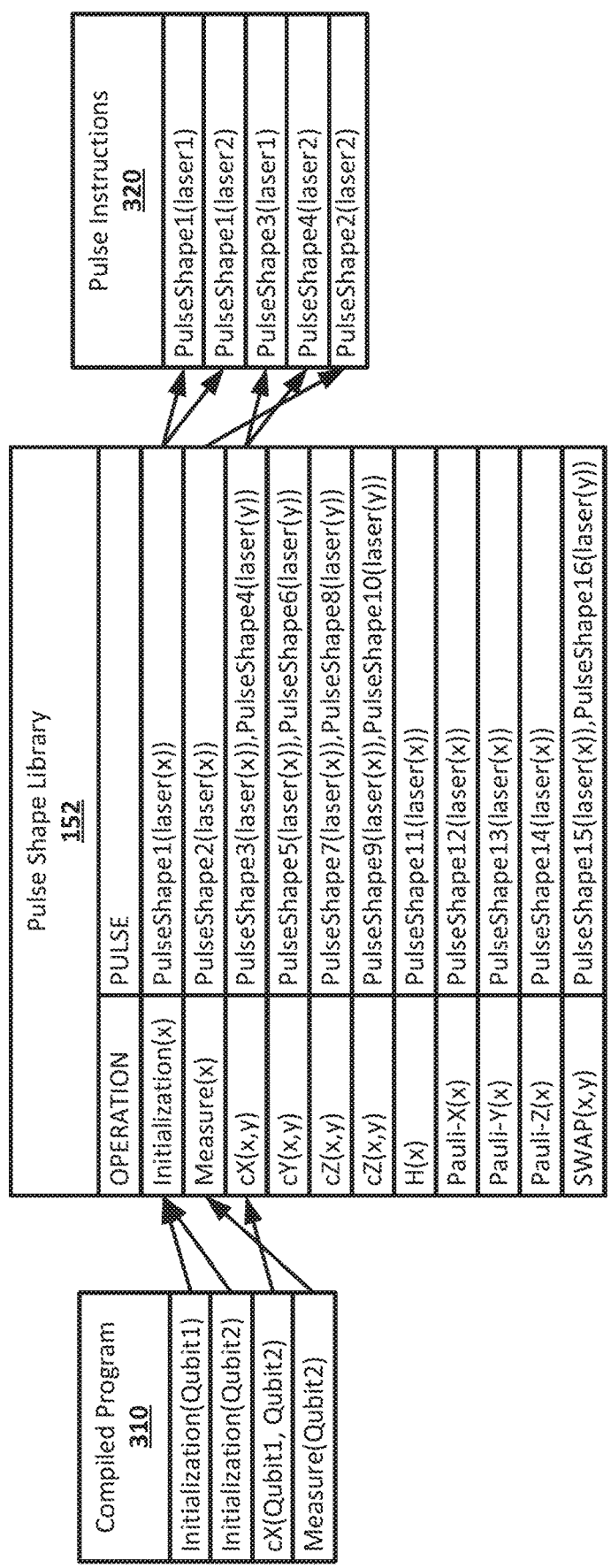
FIG. 3A shows an example arrangement suitable for pulse generation according to an implementation of the disclosed subject matter.

FIG. 3A shows an example arrangement suitable for pulse generation according to an implementation of the disclosed subject matter. A compiled program 310 generated by the compiler 110 may include quantum operations. The quantum operations may be specified in any suitable manner in the program source code and may be represented in any suitable manner in the compiled program. The quantum operations may include specifications of the qubits of the quantum computing device the quantum operations are to be applied to. A quantum operation may be applied to any number of qubits of the quantum computing device.

The pulse shape translator 120 may look up the quantum operations from the compiled program 310 in the pulse shape library 152. Each quantum operation may have pulse shapes for a corresponding pulse or pulses associated with it. For example, a quantum operation that acts on a single qubit, such as initialization operations, measuring operations, H-gates, and Pauli gates, may be associated with a pulse shape for a single pulse from a single laser aimed at a single qubit. A quantum operation that acts on two qubits, such as controlled gate, may be associated with two pulse shapes for laser pulses aimed at separate qubits. The pulse shape library 152 may include quantum operations that act on any number of qubits, including quantum operations that act on more than two qubits. The laser pulses generated based on the pulse shapes may be sequential, or may overlap temporally.

Each separate pulse shape from the pulse shape library 152 that corresponds to a quantum operation in the compiled program 310 may be added to the pulse instructions 320 by the pulse shape translator 120 in the appropriate sequence. For example, the first quantum operation in the compiled program 310 may be an initialization instruction for the first qubit of the quantum computing device. The pulse shape translator 120 may look up the initialization operation in the pulse shape library 152 and retrieve the corresponding pulse shape. This pulse shape may be added as the first instruction in the pulse instructions 320 with the appropriate parameters, including, for example, a parameter indicating that the pulse for the instruction should be generated by the first laser of the quantum computing device, which may direct pulses at the first qubit. An instruction added to the pulse instructions 320 for a subsequent instruction in the compiled program 310 to perform the initialization operation on the second qubit of the quantum computing device may similarly use the pulse shape for the initialization instruction and a parameter indicating that the pulse for the instruction should be generated by the second laser of the quantum computing device, which may direct pulses at the second qubit.

The pulse shape translator 120 may add multiple instructions to the pulse instructions 320 for quantum operations that require multiple pulses to implement, such as quantum operations that operate on more than one qubit. For example, the compiled program 310 may include a quantum operation for a cX gate that may operate on the first and second qubits of the quantum computing device. The pulse shape translator 120 may add two instructions to the pulse instructions 320, a first instruction for the pulse shape for the component of the cX operation directed at the first qubit using the first laser, and a second instruction for the pulse shape for the component of the cX operation directed at the second qubit using the second laser. The instructions in the pulse instructions 310 may include any suitable timing information so that, for example, both of the pulses for the cX operation may be generated at the appropriate time relative to each other to implement the cX gate on the first and second qubits of the quantum computing device. Pulse instructions may have persistent effects on later pulse instructions.

FIG. 3B shows an example arrangement suitable for pulse generation according to an implementation of the disclosed subject matter. The pulse instructions 320 may be input to the binary code compiler 130. The binary code compiler 130 may generate binary format instructions 330, which may include a binary packet for each of the instructions in the pulse instructions 320. The binary code compiler 130 may generate the binary packets based on a binary code used by the FPGA of the quantum computing device that the binary format instructions 330 will be sent to. The binary packet generated from a pulse instruction may include all of the parameters and timing information from the pulse instruction, including a specification of the laser that should generate the pulse of the pulse instruction.

Figure 4:
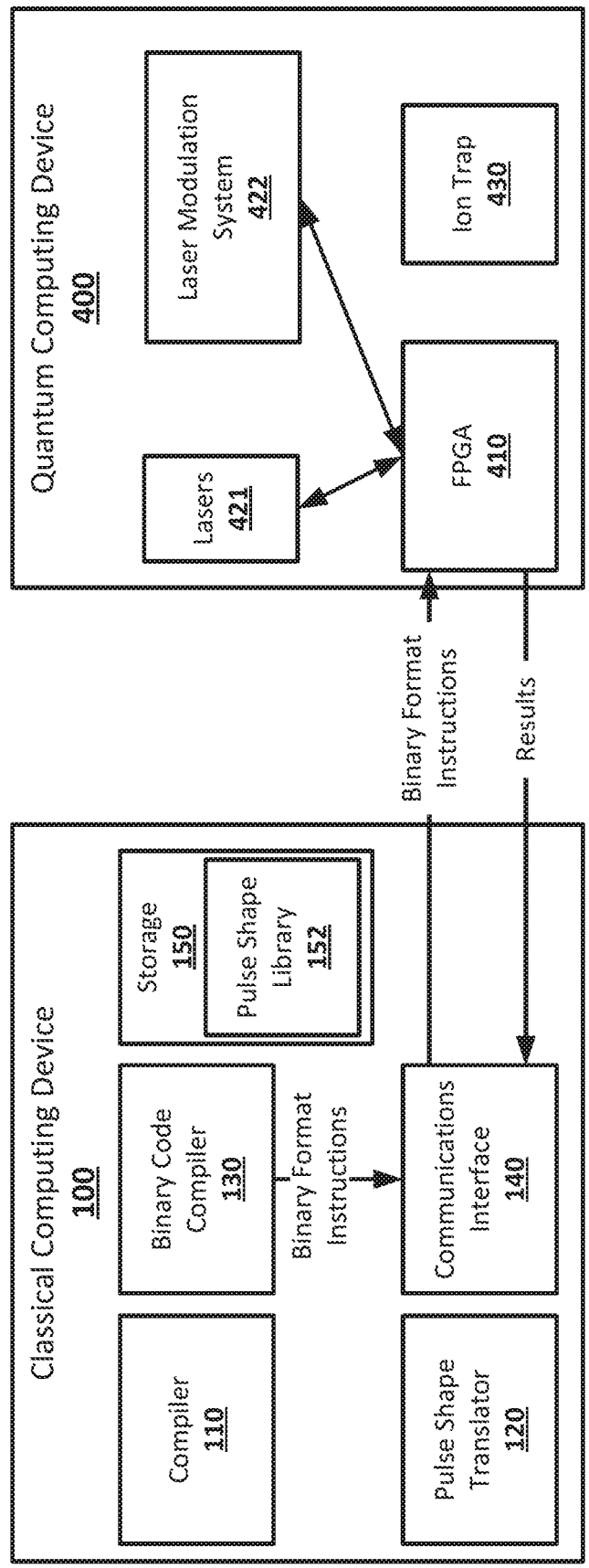
FIG. 4 shows an example arrangement suitable for pulse generation according to an implementation of the disclosed subject matter.

FIG. 4 shows an example arrangement suitable for pulse generation according to an implementation of the disclosed subject matter. Binary format instructions generated by the binary code compiler 130, such as the binary format instructions 330, may be sent to the communications interface 140. The binary format instructions may be sent to the communications interface 140 directly from the binary code compiler 130, or may be stored and sent later, for example, when the compiled program is executed on the classical computing device 100. The communications interface 140 may be in communication with a quantum computing device 400 in any suitable manner, including, for example, through wired or wireless network connections and/or direct connections.

The communications interface 140 may send the binary format instructions to an FPGA 410 of the quantum computing device 400. The quantum computing device 400 may be, for example, a trapped ion quantum computing device 400 and may include the FPGA 410, and any suitable number of lasers of any suitable type, such as, for example, lasers 421, laser modulation system 422 and ion trap 430, with any suitable number of trapped ions. The FPGA 410 may be any suitable FPGA for controlling the operation of the lasers 421 laser modulation system 422, and may be in communication with the lasers 421 and laser modulation system 422. A CPU, application-specific integrated circuit (ASIC), programmable logic device (PLD), or other electronic device that may be able to control the laser modulation system 422 based on the binary format instructions may be used in place of or in conjunction with the FPGA 422. The lasers 421 may be any suitable lasers capable of generating laser light. The laser modulation system 422 may be any suitable hardware for directing, pulsing and modulating laser light into laser pulses, including, for example, acousto-optic modulators, electro-optic modulators, physical optics components, electronic gating and all associated mechanically or electronically driven subcomponents, and may operate using microwaves. The laser pulses may be directed at ions in the ion trap 430, either directly or through the use of mirrors and other optics. Laser pulses originating at any of the lasers 421 may be directed at any of the different ion in the ion trap 430 through the laser modulation system 422.

The FPGA 410 may control the lasers 421 to generate laser light and the laser modulation system 422 to direct, pulse, and modulate the laser light to generate laser pulses in accordance with the binary format instructions received through the communications interface. The laser light from the lasers may be directed by the laser modulation system 422 at ions in the ion trap 430, using pulse shapes from the pulse shape library 152 as encoded in the binary packets of the binary format instructions, to implement the quantum operations from the program source code.

The results of any measurement operation performed on any of the ions taken by any of the lasers 421 may be returned to the FPGA 410. The FPGA 410 may return the results to the communications interface 140 on the classical computing device 100, where they may be used in any suitable manner. For example, the results may be passed from the communications interface 140 to the compiled program executing on the classical computing device 100, allowing for classical operations to be performed using the results of the quantum operations that were executed on the quantum computing device 400.

Figure 5:
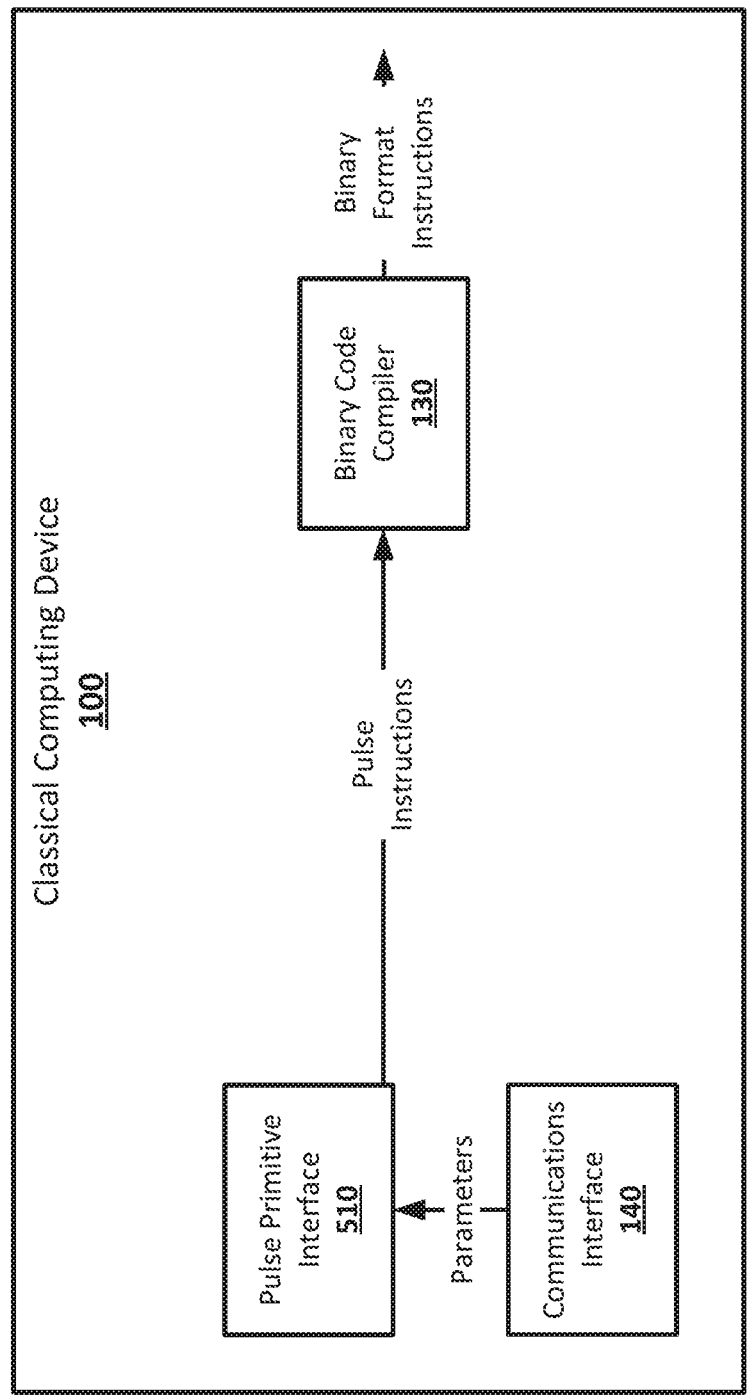
FIG. 5 shows an example arrangement suitable for pulse generation according to an implementation of the disclosed subject matter.

FIG. 5 shows an example arrangement suitable for pulse generation according to an implementation of the disclosed subject matter. In some implementations, pulse shapes may be generated using pulse primitives. A pulse primitive interface 510 running on the classical computing device 100 may allow for the specification pulse shapes based on pulse primitives. The pulse primitive interface 510 may be, for example, part of an integrated development environment. The pulse primitives may include various aspects of a pulse shape, including, for example, amplitude, width, delay on each side of a pulse, timing, the pulse type, for example, box pulse type or curve pulse type, and other suitable parameters. A pulse grammar may be used to specify the various pulse primitives and assign values to the specified pulse primitives to create pulse shapes. This may allow for the direct specification of any pulse shape to implement any quantum operation. The pulse primitive interface 510 may be used to write pulse instructions for quantum operations using the pulse grammar. Pulse instructions written using the pulse grammar may be modified by parameters received from the communications interface 140.

The pulse instructions written in the pulse grammar using pulse primitives may be input to the binary code compiler 130 from the pulse primitive interface 510. The binary code compiler 130 may generate binary format instructions for the FPGA 410 from the pulse instructions.

In some implementations, pulse instructions for a pulse shape written in the pulse primitive interface 510 using pulse primitives and the pulse grammar may be added to the pulse shape library 152. For example, a user may specify a quantum operation that corresponds to a pulse instruction for a pulse shape written using the pulse primitives. The pulse instructions for the pulse shape may be added to the pulse shape library 152 along with the corresponding quantum operation. This may allow pulse instructions written using pulse primitives to be used by the pulse shape translator 120.

Figure 6:
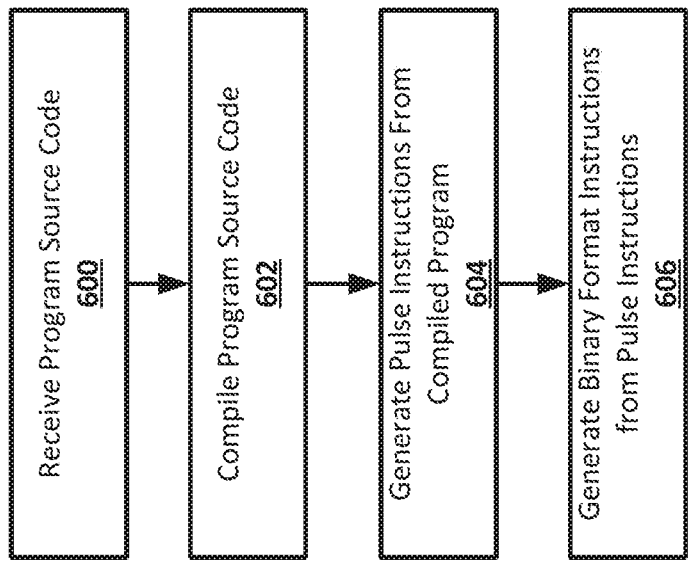
FIG. 6 shows an example procedure suitable for pulse generation according to an implementation of the disclosed subject matter.

FIG. 6 shows an example procedure suitable for pulse generation according to an implementation of the disclosed subject matter. At 600, a program source code may be received. For example, a program source code may be received on the classical computing device 100 from another computing device, or created using a user interface of the classical computing device 100, such as, for example, the user interface of an integrated development environment. The program source code may by a hybrid program that includes both classical operations and quantum operations, or may only include quantum operations. The program source code may be written in any suitable language or languages. For example, a hybrid program may be written in a classical programming language with an extended syntax for quantum operations, or may be written using both a classical programming language and a quantum programming language.

At 602, the program source code may be compiled. For example, the program source code may be input to the compiler 110 on the classical computing device 100. The compiler 110 may be any suitable compiler, interpreter, or translator of any type, for compiling the program source code into a format that is executable on the classical computing device 100 if the program is a hybrid program, or for compiling a quantum program. The compiler 110 may generate the compiled program 310, which may include any quantum operations from the program source code. The quantum operations may be specified in the compiled program 310 in any suitable manner, including, for example, as text that appears in hexadecimal view of a binary executable.

At 604, pulse instructions may be generated from the compiled program. For example, a compiled program generated from the program source code by the compiler 110, such as the compiled program 310, may be input to the pulse shape translator 120. The pulse shape translator 120 may look up quantum operations included in the compiled program 310 in the pulse shape library 152 to determine if the pulse shapes that correspond to the quantum operations. The pulse shape translator may use the pulse shapes looked up in the pulse shape library to generate the pulse instructions, such as the pulse instructions 320. The pulse shape translator 120 may modify the pulse shapes from the pulse shape library 152 based on parameters received from the communications interface 140. The parameters may be, for example, environmental and calibration parameters of a quantum computing device such as the quantum computing device 400. The pulse instructions 320 may be in any suitable format, including a human-readable format, and may include any suitable parameters and timing information in conjunction with the pulse shapes to implement the quantum operations from the compiled program 310.

At 606, binary format instructions may be generated from the pulse instructions. For example, pulse instructions, such as the pulse instructions 320, generated by the pulse shape translator 120 may be input to the binary code compiler 130. The binary code compiler 130 may generate binary format instructions, such as the binary formation instructions 330. The binary format instructions 330 may include binary packets for each of the instructions in the pulse instructions 320. The binary packets may use a binary code for the FPGA 410 of the quantum computing device 400 to encode the instructions from the pulse instructions 320, including pulse shapes, parameters, and timings, in a format that may be understandable by the FPGA 410. The binary format instructions may be implemented by the FPGA 410 to control lasers, such as the lasers 421, and the laser modulation system 422, of the quantum computing device 400 to implement the quantum operations as specified in the program source code used to generate the compiled program 310, pulse instructions 320, and binary format instructions 330.

Figure 7:
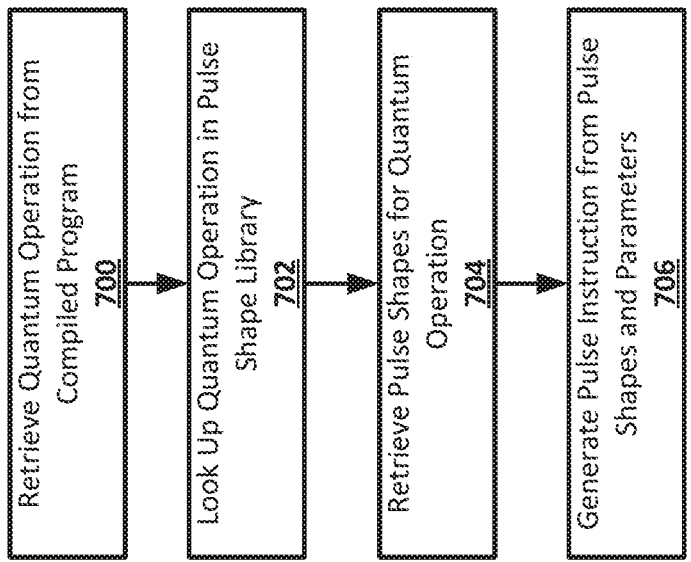
FIG. 7 shows an example procedure suitable for pulse generation according to an implementation of the disclosed subject matter.

FIG. 7 shows an example procedure suitable for pulse generation according to an implementation of the disclosed subject matter. At 700, a quantum operation may be retrieved from a compiled program. For example, the pulse shape translator 120 may retrieve a quantum operation included in the compiled program 310. Quantum operations may be specified in the compiled program 310 in any suitable format, such that they may be identified as quantum operations separate from the classical operations in the compiled program 310.

At 702, the quantum operation may be looked up in a pulse shape library. For example, the pulse shape translator 120 may have retrieved the quantum operation of applying a cX-gate to the first and second qubits of the quantum computing device 400 from the compiled program 310. The pulse shape translator 120 may look-up the cX-gate quantum operation in the pulse shape library 152 to determine if pulse shapes for the quantum operation exist in the pulse shape library 152.

At 704, pulse shapes for the quantum operation may be retrieved. For example, pulse shape translator 120 may have located the cX-gate quantum operation in the pulse shape library 152, and may retrieve the pulse shapes that correspond to the cX-gate quantum operation. A quantum operation may have any number of corresponding pulse shapes in the pulse shape library 152. The pulse shape translator 152 may retrieve all of the pulse shapes that correspond to a looked-up quantum operation.

At 706, a pulse instruction may be generated from the pulse shapes and parameters. For example, the pulse shape translator 120 may generate an instruction of the pulse instructions 320. The pulse instruction may be generated by, for example, filling in any suitable values for the pulse shapes, such as a value indicating the laser of the quantum computing device 400 that will be used to generate the laser light to be used for the pulse shape, values indicating devices and components of the laser modulation system 422 to use to generate the laser pulse in the appropriate pulse shape from the laser light, including parameters for the operation of the components and devices, and adjusting the pulse shape based on parameters of the quantum computing device 400.

Figure 8:
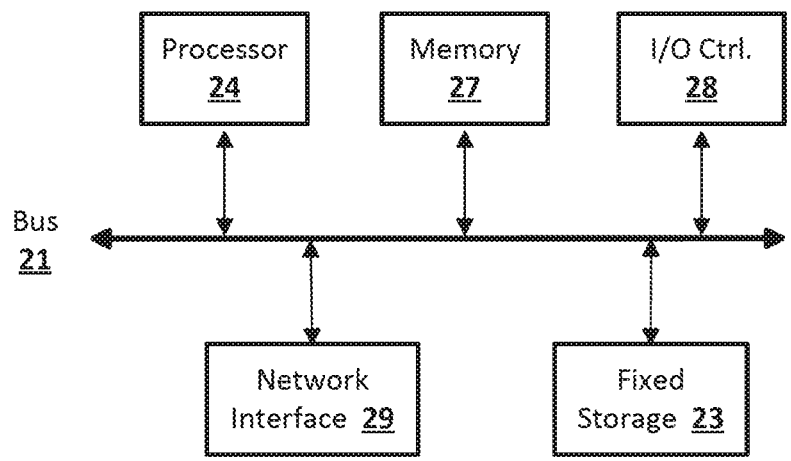
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
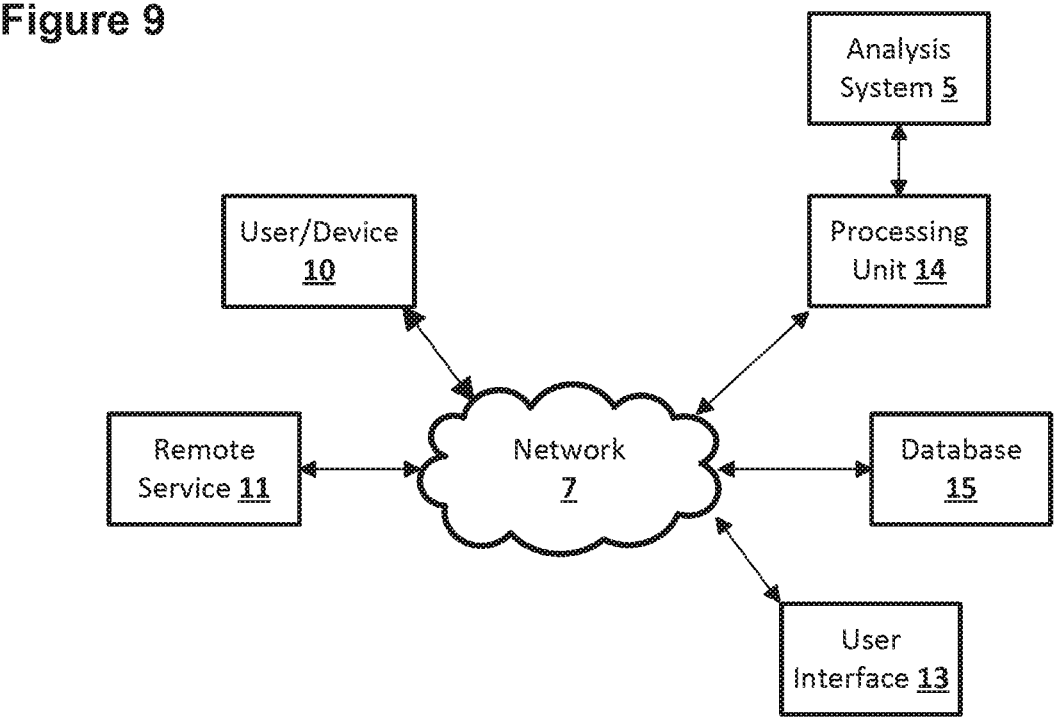
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
  receiving, at a classical computing device, a program source code comprising one or more quantum operations;
  compiling the program source code into a compiled program comprising the one or more quantum operations;
  determining one or more pulse shapes that a pulse shape library indicates corresponds to each of the one or more quantum operations, wherein the pulse shape library comprises a listing of quantum operations and pulse shapes that correspond to the quantum operations and are complete pulse shapes that can implement the quantum operations to which they correspond without adjustment, and wherein each of the quantum operations in the pulse library corresponds to all of the pulse shapes that implement the quantum operations to which they correspond when generated by lasers and directed at trapped ions, further comprising:
    retrieving one of the one or more quantum operations from the compiled program,
    looking up the one of the one or more quantum operations in the pulse shape library, and
    retrieving from the pulse shape library one or more pulse shapes corresponding to the quantum operation; and
  generating pulse instructions based on the one or more pulse shapes that the pulse shape library indicates corresponds to each of the one or more quantum operations.

2. The method of claim 1, wherein generating pulse instructions based on the one or more pulse shapes that the pulse shape library indicates corresponds to each of the one or more quantum operations further comprises combining the one or more pulse shapes with one or more parameters of a quantum computing device and one or more values, wherein at least one of the one or more values comprises an indication of a component of a laser modulation system of the quantum computing device.

3. The method of claim 1, further comprising:
  generating binary format instructions based on the pulse instructions, wherein the binary format instruction encode the pulse instructions in binary packets using a binary code of a field programmable gate array (FPGA) of a quantum computing device.

4. The method of claim 3, further comprising transmitting the binary format instructions to the FPGA of the quantum computing device, wherein the quantum computing device comprises one or more lasers and a laser modulating system controlled by the FPGA, and wherein laser light from the lasers is directed at one or more trapped ions as laser pulses by the laser modulating system based on the binary format instructions.

5. The method of claim 1, wherein the program source code includes classical operations and quantum operations.

6. The method of claim 1, further comprising receiving parameters of the quantum computing device through a communications interface on the classical computing device.

7. A computer-implemented system comprising:
a classical computing device that receives a program source code comprising one or more quantum operations, compiles the program source code into a compiled program comprising the one or more quantum operations, determines one or more pulse shapes that a pulse shape library indicates corresponds to each of the one or more quantum operations by retrieving one of the one or more quantum operations from the compiled program, looking up the one of the one or more quantum operations in the pulse shape library, and retrieving from the pulse shape library one or more pulse shapes corresponding to the quantum operation, and generates pulse instructions based on the one or more pulse shapes that the pulse shape library indicates corresponds to each of the one or more quantum operations, wherein the pulse shape library comprises a listing of quantum operations and pulse shapes that correspond to the quantum operations and are complete pulse shapes that can implement the quantum operations to which they correspond without adjustment and wherein each of the quantum operations in the pulse library corresponds to all of the pulse shapes that implement the quantum operations to which they correspond when generated by lasers and directed at trapped ions; and
a quantum computing device comprising one or more lasers that generate laser light, a laser modulation system that directs the laser light at one or more trapped ions, and an FPGA that controls the one or more lasers and the laser modulation system based on binary format instructions received from the classical computing device.

8. The system of claim 7, wherein the classical computing device generates pulse instructions based on the one or more pulse shapes that the pulse shape library indicates corresponds to each of the one or more quantum operations by combining the one or more pulse shapes with one or more parameters of a quantum computing device and one or more values, wherein at least one of the one or more values comprises an indication of a component of the laser modulation system of the quantum computing device.

9. The system of claim 7, wherein the classical computing device further generates the binary format instructions based on the pulse instructions, wherein the binary format instruction encode the pulse instructions in binary packets using a binary code of the FPGA of the quantum computing device.

10. The system of claim 9, wherein the classical computing device further transmits the binary format instructions to the FPGA of the quantum computing device.

11. The system of claim 10, wherein the program source code includes classical operations and quantum operations.

12. The system of claim 7, wherein the classical computing device further receives parameters of the quantum computing device through a communications interface on the classical computing device.

13. A system comprising: one or more computers and one or more storage devices storing instructions which are operable, when executed by the one or more computers, to cause the one or more computers to perform operations comprising:
receiving, at a classical computing device, a program source code comprising one or more quantum operations;
compiling the program source code into a compiled program comprising the one or more quantum operations;
determining one or more pulse shapes that a pulse shape library indicates corresponds to each of the one or more quantum operations, wherein the pulse shape library comprises a listing of quantum operations and pulse shapes that correspond to the quantum operations and are complete pulse shapes that can implement the quantum operations to which they correspond without adjustment and wherein each of the quantum operations in the pulse library corresponds to all of the pulse shapes that implement the quantum operations to which they correspond when generated by lasers and directed at trapped ions, further comprising:
retrieving one of the one or more quantum operations from the compiled program,
looking up the one of the one or more quantum operations in the pulse shape library, and
retrieving from the pulse shape library one or more pulse shapes corresponding to the quantum operation; and
generating pulse instructions based on the one or more pulse shapes that the pulse shape library indicates corresponds to each of the one or more quantum operations.

14. The system of claim 13, wherein the instructions which are operable, when executed by the one or more computers, to cause the one or more computers to perform the operation comprising generating pulse instructions based on the one or more pulse shapes that the pulse shape library indicates corresponds to each of the one or more quantum operations further comprises instructions which are operable, when executed by the one or more computers, to cause the one or more computers to perform operations comprising combining the one or more pulse shapes with one or more parameters of a quantum computing device and one or more values, wherein at least one of the one or more values comprises an indication of a component of a laser modulation system of the quantum computing device.

15. The system of claim 13, further comprising instructions which are operable, when executed by the one or more computers, to cause the one or more computers to perform an operation comprising generating binary format instructions based on the pulse instructions, wherein the binary format instruction encode the pulse instructions in binary packets using a binary code of a field programmable gate array (FPGA) of a quantum computing device.

16. The method of claim 1, wherein the program source code is for a hybrid program and comprises one or more classical operations, and wherein compiling the program source code into a compiled program comprising the one or more quantum operations further comprises compiling the program source code into the compiled source code comprising the one or more classical operations.

17. The system of claim 7, wherein the program source code is for a hybrid program and comprises one or more classical operations, and wherein the classical computing device compiles the program source code into a compiled program comprising the one or more quantum operations by further compiling the program source code into the compiled source code comprising the one or more classical operations.

18. The system of claim 13, wherein the program source code is for a hybrid program and comprises one or more classical operations, and wherein the instructions which are operable, when executed by the one or more computers, to cause the one or more computers to perform the operation comprising compiling the program source code into a compiled program comprising the one or more quantum operations further comprises instructions which are operable, when executed by the one or more computers, to cause the one or more computers to perform operations comprising compiling the program source code into the compiled source code comprising the one or more classical operations.

* * * * *